United States Patent [19]

Hullein et al.

[11] Patent Number: 4,664,519

[45] Date of Patent: May 12, 1987

[54] ANGLE ENCODER FOR ENCODING THE ZENITHAL ANGLE BETWEEN A VARIABLE DETERMINED DIRECTION AND THE VERTICAL, IN PARTICULAR FOR A THEODOLITE

[75] Inventors: Francois Hullein, Nantes; Jacques Bodin, Vertou, both of France

[73] Assignee: Societe d'Etudes, Recherches et Constructions Electroniques Sercel, Carquefou, France

[21] Appl. No.: 694,274

[22] Filed: Jan. 24, 1985

[30] Foreign Application Priority Data

Feb. 1, 1984 [FR] France .................. 84 01543

[51] Int. Cl.⁴ ........................... G01B 11/26
[52] U.S. Cl. .................. 356/152; 356/149; 250/231 SE; 33/1 T
[58] Field of Search .......... 250/231 SE, 231 GY; 356/149, 141, 152; 350/505; 33/1 T, 1 PT, 283, 377, 391

[56] References Cited

U.S. PATENT DOCUMENTS 4,108,539  8/1978  Gort et al. ..................... 350/444
4,136,955  1/1979  Aeschlimann et al. ......... 356/141 X

FOREIGN PATENT DOCUMENTS 2152749  6/1972  Fed. Rep. of Germany.
2653275  8/1978  Fed. Rep. of Germany.
0260977  1/1970  U.S.S.R. ..................... 356/141

Primary Examiner—Eugene R. LaRoche
Assistant Examiner—Robert J. Pascal
Attorney, Agent, or Firm—Schwartz, Jeffery, Schwaab, Mack, Blumenthal & Evans

[57] ABSTRACT

The encoder comprises a pendulum (P) mounted to rotate about a horizontal axis (O-O) which is substantially coaxial with a reference axis (R-R) of an index disk and which carries vertical optical detector equipment ($T_{M\pi E}$, $T_{M\pi R}$, $T_{MOE}$, $T_{MOR}$), optical guidance means ($M_1$, $M_2$, $M_3$, $M_4$, $T_5$) fixed to the pendulum and suitable for guiding radiation generated by an optical transmitter ($T_{M\pi E}$) towards an associated optical receiver ($T_{M\pi R}$) along a predetermined optical path intersecting the disk (D), and a liquid level forming device (L) fixed to the pendulum (P) and inserted on the optical path upstream from the said point of interception between the optical path and the disk, the said optical guidance means ($M_1$, $M_2$, $M_3$, $M_4$, $M_5$) and the liquid level forming device (L) being adapted to ensure an angular deviation of the point of intersection of the light radiation and the disk relative to the pivot axis (O-O) which compensates the angular shift between the pendulum (P) and the vertical.

19 Claims, 4 Drawing Figures

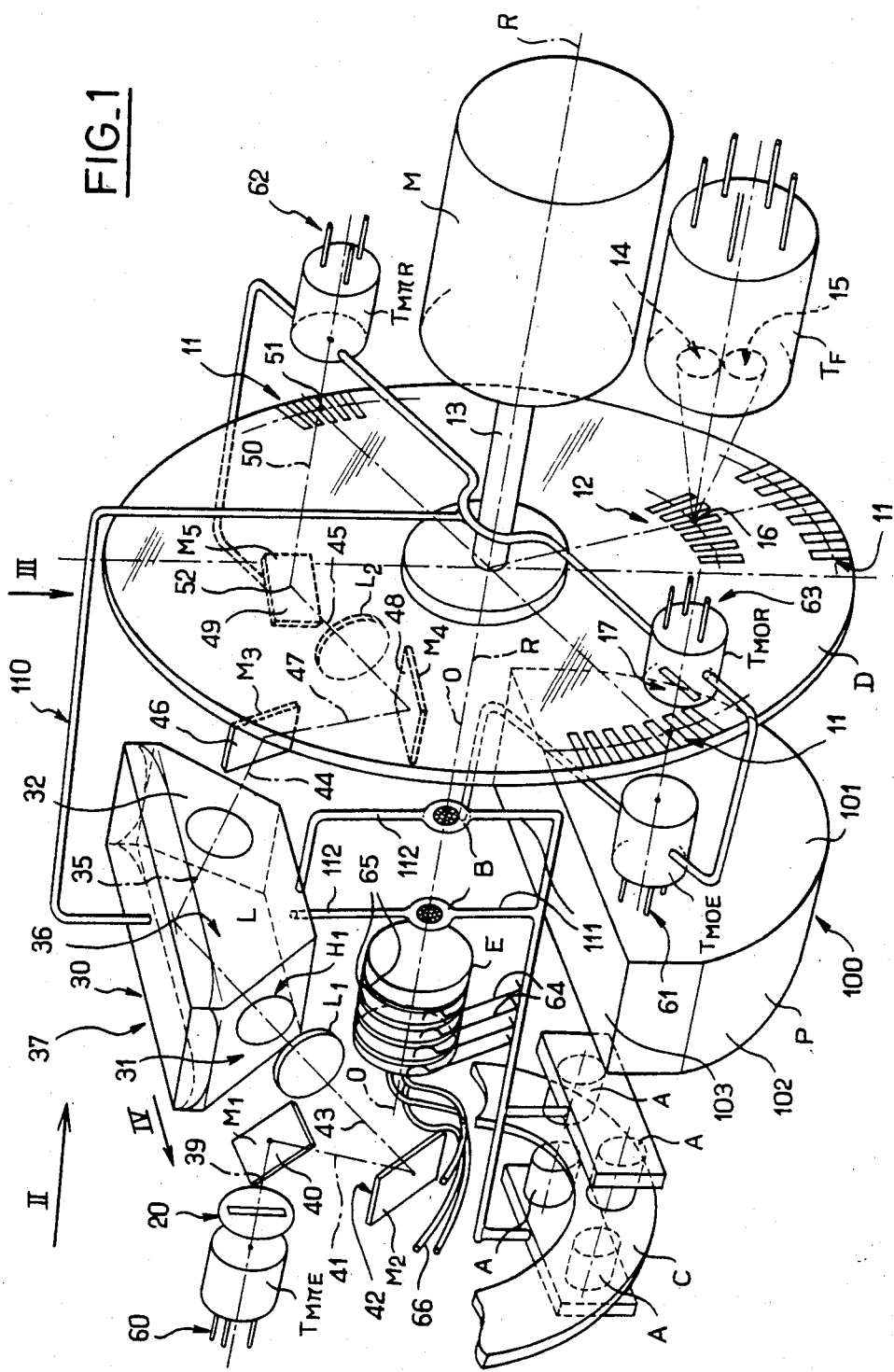
FIG_1

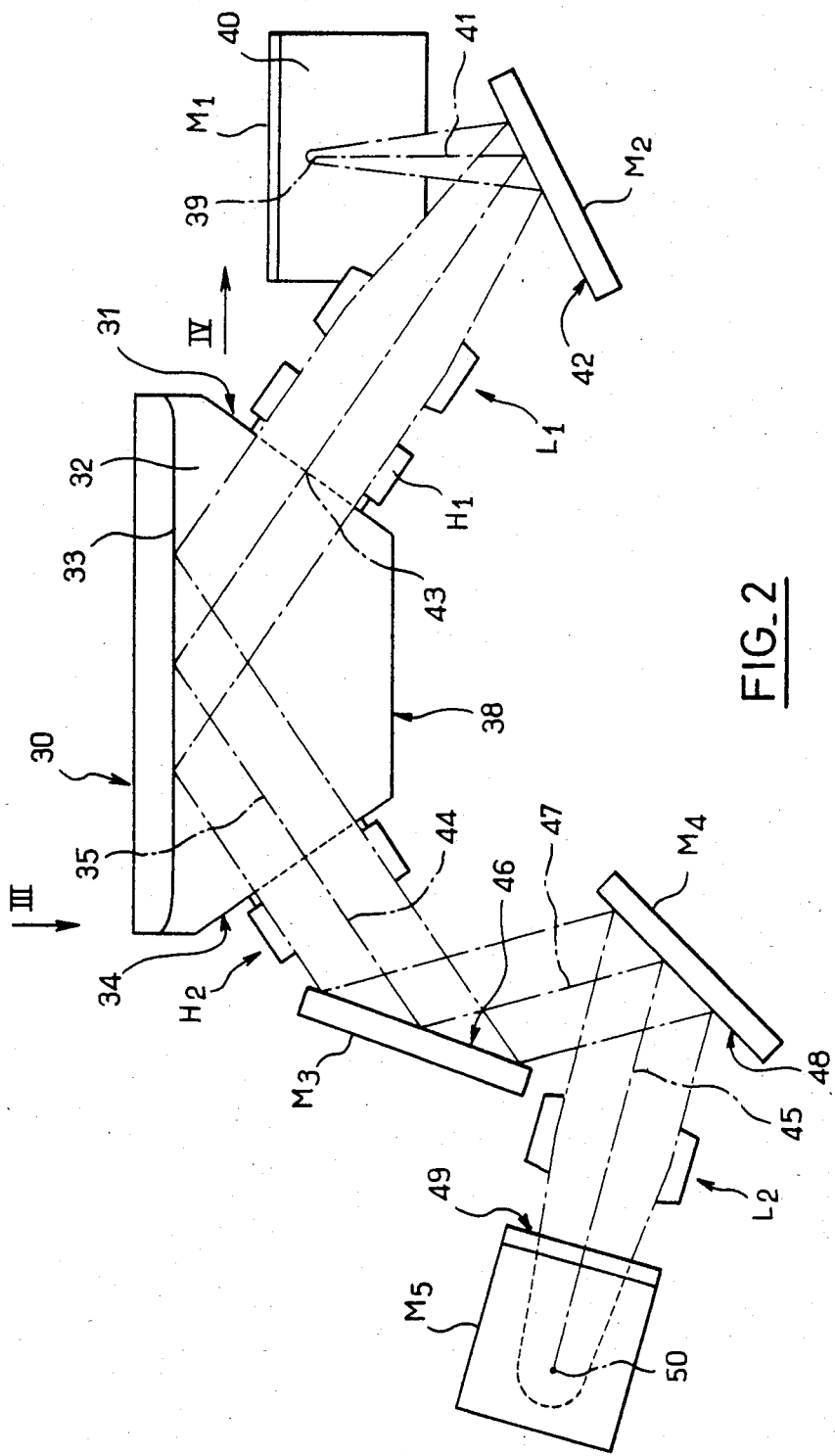
FIG_2

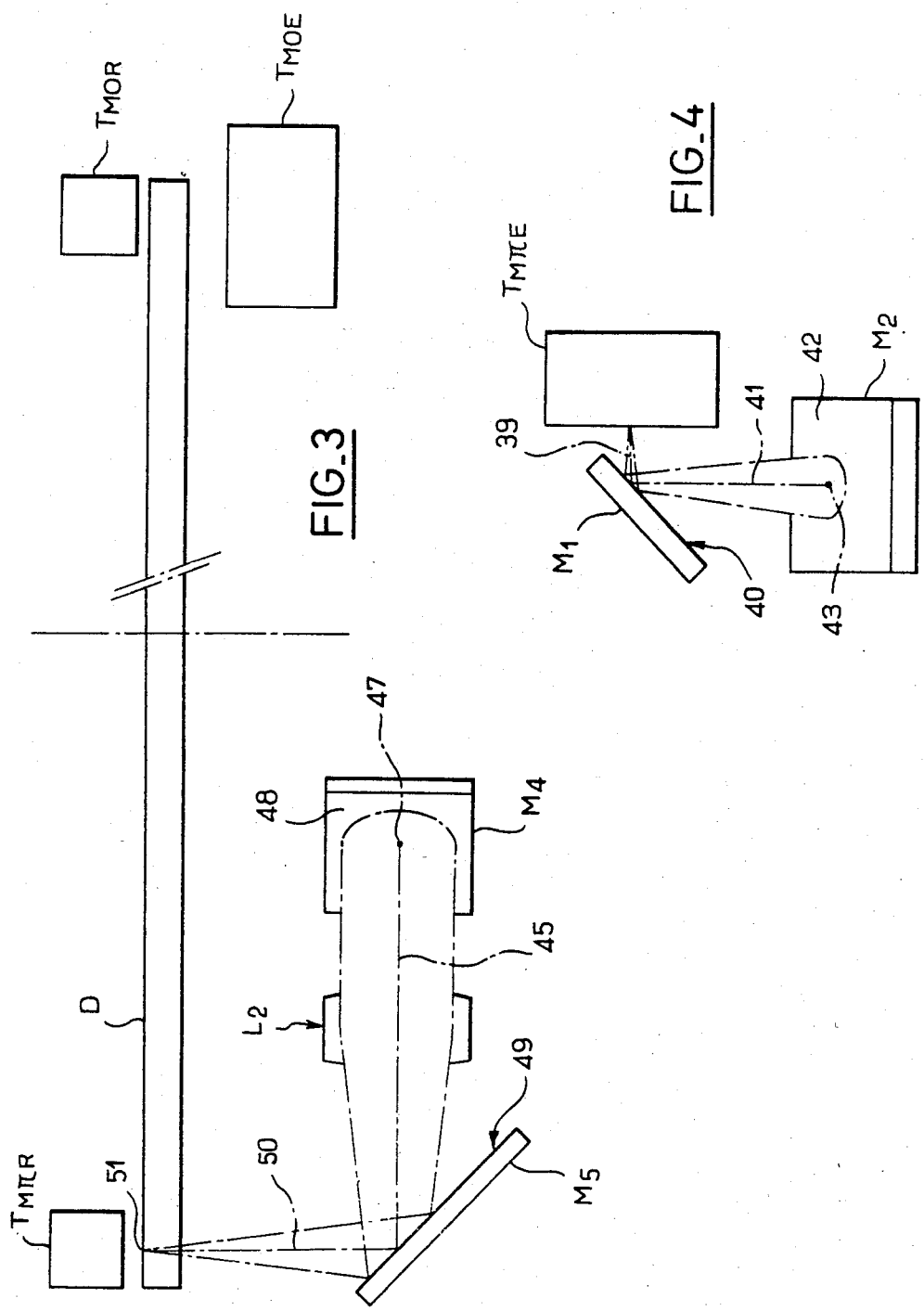

ANGLE ENCODER FOR ENCODING THE ZENITHAL ANGLE BETWEEN A VARIABLE DETERMINED DIRECTION AND THE VERTICAL, IN PARTICULAR FOR A THEODOLITE

The present invention relates to an encoder for a variable zenithal angle intended for use in particular in a theodolite for performing topographical surveys.

FIELD OF THE INVENTION

More particularly, the present invention relates to an angle encoder for encoding the zenithal angle between a variable determined direction and the vertical, in particular for a theodolite, the encoder being of the type comprising:

a disk which includes at least one series of marks distributed around a circular track centered on a horizontal reference axis;

at least one optical detector suitable for pivoting about an axis which is coaxial with the reference axis of the disk and which represents the vertical relative to the pivot axis, the above-mentioned vertical optical equipment including optical transmitter means associated with optical receiver means placed facing the track to detect the marks thereon, and measuring means which are sensitive to the detection of the marks by the equipment.

Preferably, two optical detectors suitable for relative pivoting about an axis coaxial with the reference axis of the disk are provided. The first and second optical detectors respectively represent, relative to the relative pivot axis, the determined direction and the vertical. The measuring means are then sensitive to the detection of the marks by each of the detectors to determine the angular shift therebetween.

Further, and preferably, the disk is driven in rotation about the reference axis and the marks are radial marks angularly spaced relative to said reference axis.

BACKGROUND OF THE INVENTION

Such angle encoders are described in particular in published French patent applications Nos. 2 270 722, 2 304 224 and 2 406 804.

Reference can usefully be made to these documents to fully understand the present invention and the contents of these documents should be considered as being incorporated in the present description by the reference which is hereby made to these documents.

It is recalled that topographical surveys are made by determining the polar coordinates of an observed point in an orthonormalized system having two axes situated in a horizontal plane and a third axis corresponding to the vertical or zenith, the origin of the system being the observation point.

To do this, the equipment used for performing topographical surveys generally comprise a theodolite and a telemeter or other distance measuring apparatus suitable for measuring the distance between the point of observation and the observed point, the theodolite includes a sighting telescope which is pointed towards the observed point and which serves to determine the direction of the sighting axis which passes through the point of observation and the observed point. The theodolite measures both the azimuth of the observed point, i.e. the angle formed by the projection in a horizontal plane of the sighting axis and a horizontal reference axis, e.g. magnetic north, and also the zenithal angle, i.e. the angle formed between the sighting axis and the zenith.

More precisely, the theodolite comprises a horizontal angle encoder adapted to measure the azimuth and a vertical angle encoder adapted to measure the zenithal angle.

These angular encoders are disposed in the alidade, i.e. the moving part of the theolodite which includes the sighting telescope.

To enable a measurement to be made, the alidade is levelled in two directions, for example by means of three screws and under the control of instruments for verifying the degree to which a reference plane of the alidade is horizontal.

The sensitivity of these instruments, generally known as alidade levels is about 10 mgrd or $15.7 \times 10^{-7}$ rd, which is sufficient for measuring the azimuth with an accuracy of 0.5 to 2 mgrd.

However, it is clear that the reference accuracy obtained with the alidade leveller is not acceptable for giving the reference zenith with sufficient accuracy to enable measurements performed by the vertical encoder to be as accurate as those performed by the horizontal encoder (i.e. 0.5 to 2 mgrd).

One proposal for achieving this end has been to provide theodolites with a vertical index leveller for correcting errors in theodolite positioning and thus of a vertical index associated with the vertical encoder.

However, this proposal has a major drawback, namely of requiring the vertical index level to be adjusted for each position of the alidade, i.e. at each new angle measurement.

Attempts have been made to remedy this drawback by fitting theodolites with automatic vertical compensators, and this applies both to optical and electronic theodolites.

Such compensation is generally performed by inserting a compensator on the optical path of the light beam used for performing the angle measurement.

Up to the present, two techniques have been used for this purpose in practice.

One of them consists in correcting the reading of the graduated disk integrated in the encoder by means of a prism suspended from a cross-wire pendulum.

The other consists in correcting the reading of the graduated disk by refracting the light beam through a liquid of constant refractive index or by means of data related to the reflection of radiation at the surface of the liquid, e.g. mercury, as is described in U.S. Pat. No. 4,108,539.

The design of these compensating devices, i.e. for compensating the reference zenith, requires the vertical angle encoder to be disposed coaxially with the axis of rotation of the sighting telescope.

This is naturally an encumbrance when it comes to placing the various components required in a compact theodolite.

Further, the maximum range of compensation is limited to about $\pm 0.1$ grd to $\pm 0.5$ grd.

Preferred embodiments of the present invention provide a novel angle encoding device which provides direct measurements of the zenithal angle from 0 to 200 grd with good accuracy.

SUMMARY OF THE INVENTION

This is achieved according to the present invention by means of an angle encoder of the above-defined type which further includes:

a small pendulum rotatably mounted about a horizontal axis which is at least substantially aligned with the reference axis of the disk and which carries the vertical optical equipment;

optical guidance means which are fixed to the pendulum and are adapted to guiding light radiation generated by an optical transmitter of the vertical optical equipment towards an associated receiver along a predetermined optical path intersecting the said track of marks on the disk; and a liquid level device fixed to the pendulum and interposed on the optical path connecting the said transmitter and the said associated receiver of the vertical optical equipment, the level being inserted on the path upstream from its point of intersection with the marks on the disk, the optical guidance means and the liquid level device being adapted to ensure an angular deviation of the point of intersection of the light radiation and the track of marks on the disk relative to the pivot axis for compensating the angular error between the pendulum and the vertical.

One of the important advantages of the invention is in particular the fact that it avoids requiring the vertical angle encoder to be coaxial with the axis of rotation of the sighting telescope. As is explained below, the vertical angle encoder in accordance with the invention may be fixed to the sighting telescope itself and at any point thereon.

As is explained in greater detail below, the pendulum integrated with the angle encoder constitutes an approximate vertical reference while the liquid level forming device provides fine compensation to take account of the angular shift between the pendulum and the true vertical.

The length and the weight of the pendulum are necessarily limited if it is to be installed on a theodolite, and it is thus impossible to completely overcome the inevitable friction between the pendulum and the bearing from which it is suspended.

The optical detector equipment representing the vertical is referred to as "vertical optical equipment" in the following description (or "the second equipment" when the encoder includes a first equipment representing the determined direction and a second equipment representing the vertical), but this expression must not be considered as limiting the physical position of said equipment.

Preferably, the optical guidance means are adapted to introduce the radiation generated by the optical transmitter of the vertical optical equipment into the liquid of the liquid level device to ensure reflection of the radiation under the free surface of the liquid.

More precisely, and preferably, the liquid level forming device comprises a tank containing the liquid and which includes two side faces which are at least partially transparent to the light radiation generated by the optical transmitter to respectively enable said radiation to enter into the liquid and to enable the radiation to leave the liquid after reflection under the free surface thereof, the said optical guidance means being adapted to direct the light radiation from the optical transmitter perpendicularly to the inlet side face.

This feature makes it possible to avoid any refraction of the radiation when it penetrates into the liquid, and thus only the refraction which occurs at it leaves the liquid needs to be taken into account for determining the parameters of the optical guidance means.

According to other advantageous features of the present invention, the optical guidance means may comprise firstly an inlet lens interposed between the liquid level forming device and the optical transmitter of the vertical optical equipment, said transmitter being placed at the focus of the inlet lens, and secondly an outlet lens interposed between the liquid level forming device and the receiver of the vertical optical equipment, with the track of marks on the disk being coplanar with the focal plane of the outlet lens.

The optical guidance means advantageously include mirrors, and the number of mirrors disposed between the liquid level forming device and the outlet lens should be an even number.

Preferably the angle encoder includes a brake suitable for damping oscillations of the pendulum.

In a simple and cheap embodiment the oscillations of the pendulum are damped using the conventional eddycurrent technique. To do this, the brake comprises an electrically conductive component, and at least one magnetic field generator component placed adjacent thereto, one of said components being placed on the pendulum and the other on a fixed frame relative to which the pendulum swings.

Another advantageous feature of the invention enables the various components of the encoder to be simply and compactly placed, with the optical guidance means comprising:

first guidance means suitable for directing the light radiation generated by the optical transmitter of the vertical optical equipment towards the liquid level forming device at an incidence which is substantially parallel to the disk; and second guidance means disposed on the optical path between the liquid level forming device and the disk, suitable for receiving the light radiation leaving the liquid level forming device and for deviating said radiation towards the track of marks at an incidence normal to the disk.

In order to compensate any misalignment between the relative pivot axis of the optical detector equipment which corresponds to the pendulum pivot axis and the reference axis of the disk which corresponds to the axis of rotation thereof if it does rotate, one of the detectors includes two detector assemblies each comprising an optical transmitter device associated with an optical receiver device, the receiver devices being substantially diametrically opposed about the relative pivot axis of the detectors, thereby compensating any misalignment of the relative pivot axis and the reference axis of the disk.

More precisely, the one of the detectors which includes two detector assemblies is preferably the vertical optical detector carried by the pendulum and representing the vertical. In this case, the vertical optical equipment carried by the pendulum comprises:

a main assembly comprising the optical transmitter and the associated optical receiver having the liquid level forming device disposed on the optical path thereof; and an auxiliary assembly which comprises an auxiliary optical transmitter device and an auxiliary optical receiver device;

said auxiliary optical receiver device being substantially diametrically opposed to the optical receiver device of the main assembly about the relative pivot axis; and the radiation generated by the auxiliary optical transmitter being directed directly towards the auxiliary optical receiver device with only the disk being interposed on the auxiliary optical path interconnecting the auxiliary optical devices.

Advantageously, the two receiver devices are more precisely equidistant from the relative pivot axis, i.e. symmetrical relative thereto.

According to another important feature of the present invention, the focal length f of the outlet lens is derived from the equation:

$$f = R/(\eta \cdot \cos \beta),$$

in which

R represents the distance separating the relative pivot axis and the point of intersection between the optical path and the track of marks provided on the disk;

$\eta$ represents the refractive index of the liquid contained in the liquid level forming device; and $\beta$ represents the angle of the beam emerging from the liquid level forming device prior to deviation by the second guidance means towards the disk and relative to a plane passing through the relative pivot axis and the point of intersection between the track of marks provided on the disk and the light radiation.

Yet more precisely, according to the embodiment of the invention which is currently preferred, the angle encoder for encoding the zenithal angle between a variable determined direction and the vertical, and in particular for a theodolite comprises:

a disk which includes at least one series of marks distributed on a circular track centered on a horizontal reference axis;

first and second optical detectors capable of relative pivoting about an axis coaxial with the reference axis of the disk, the first and second detectors respectively representing, relative to the relative pivot axis, the determined direction and the vertical, each of the detectors including optical transmitter means and associated optical receiver means placed facing the track of marks for detecting the presence thereof in front of each of the detectors; and means for measuring the angular shift between the detectors, which means are sensitive to the detection of the marks by each of the detectors;

a small pendulum mounted to rotate about a horizontal axis which is at least substantially coaxial with the reference axis of the disk and which carries the second detector equipment;

a liquid level forming device fixed to the pendulum;

optical guidance means fixed to the pendulum and adapted to guide light radiation generated by an optical transmitter of the second equipment towards an associated receiver along a predetermined optical path intersecting the track of marks on the disk, and having the liquid level forming device inserted thereon, the optical guidance means comprising:

first guidance means suitable for directing the light radiation generated by the optical transmitter of the second detector equipment at an incidence parallel to the disk towards, an inlet lens disposed upstream from the liquid level forming device on the optical path and having a focus at which the optical transmitter of the second detector equipment is disposed such that the radiation penetrating the liquid does so in the form of a parallel beam via an inlet side face of the liquid level forming device at a normal incidence to said face to be reflected under the surface of the liquid and to leave the liquid parallel to the disk via an outlet side face of the liquid level forming device;

auxiliary optical guidance means suitable for receiving the radiation from the liquid level forming device and to direct it at an incidence which intersects the relative pivot axis towards;

an outlet lens; and second optical guidance means disposed between the outlet lens and the track of marks provided on the disk, suitable for deflecting the radiation towards the disk at an incidence normal thereto, with the focal plane of the outlet lens coinciding with the track of marks on the disk and on the optical path.

According to this preferred embodiment, the second level detector comprises more precisely:

a main assembly comprising the optical transmitter and the associated optical receiver and having the optical guidance means and the liquid level forming device interposed on their optical path; and an auxiliary assembly which includes an auxiliary optical transmitter device and an auxiliary optical receiver device;

said auxiliary optical receiver device being symmetrically disposed to the optical receiver of the main assembly about the relative pivot axis, the radiation generated by the auxiliary optical transmitter device being directly directed towards the auxiliary optical receiver device with only the disk being interposed on the auxiliary optical path between said devices; and the focal length f of the outlet lens being determined by the equation:

$$f = R/n,$$

in which

R represents the distance separating the relative pivot axis and the point of interception between the optical path and the rotary path of the marks on the disk; and n represents the refracted index of the medium contained in the liquid level forming device.

BRIEF DESCRIPTION OF THE DRAWINGS

An embodiment of the invention is described by way of example with the reference to the accompanying drawings in which:

FIG. 1 is a perspective diagram of an angle encoder for encoding the zenithal angle in accordance with the present invention;

FIG. 2 is a side view along an observation angle parallel to the reference axis of the disk which is diagrammatically illustrated by the arrow referenced II in FIG. 1. This view shows the major portion of the optical guidance means for an angle encoder in accordance with the present invention;

FIG. 3 is a plan view along an axis referenced III in FIGS. 1 and 2 of the optical guidance means disposed immediately upstream from the optical receiver of the second detector equipment; and FIG. 4 is a side view of the optical transmitter of the second detector equipment of a zenithal angle encoder in accordance with the invention and looking along an observation angle perpendicular to the angle of observation of FIG. 2 and referenced VI in FIGS. 1 and 2.

DESCRIPTION OF THE PREFERRED EMBODIMENTS

The following detailed description deals successively with the general structure of a zenithal angle encoder in accordance with the present invention, its measuring principle, the detailed structure of the second optical detector integrated in the encoder, and finally gives details of the automatic correction process.

We begin by describing the general structure of the angle encoder shown in the figures.

In general, as is shown in particular in FIG. 1, the angle encoder comprises a disk D which is generally vertical, including radial marks 11, 12 and having a horizontal axis referenced R—R. A first detector $T_F$ is provided for detecting the marks 12. A pendulum mass P is rotatably mounted on bearings B, e.g. all bearings, to rotate about an axis O—O which is at least substantially coaxial with the axis R—R of the disk D. The pendulum P supports firstly a liquid levelling device L, and secondly optical means (mirrors $M_1$ to $M_5$ and lenses $L_1$, $L_2$), and further supports a second detector comprising the components referenced $T_{M\pi E}$, $T_{M\pi R}$, $T_{MOE}$ and $T_{MOR}$, for detecting the marks 11 on the disk. The components $T_{M\pi E}$ and $T_{MOE}$ represent optical transmitters, while the components $T_{M\pi R}$ and $T_{MOR}$ represent optical receivers, with the transmitters and receivers being associated in pairs.

The second detector $T_{M\pi E}$, $T_{M\pi R}$, $T_{MOE}$ and $T_{MOR}$ as supported by the pendulum P is capable of pivoting relative to the first equipment $T_F$ about the axis O—O of the bearings B, which axis is substantially coaxial with the reference axis R—R of the disk.

The first optical detector $T_F$ represents the determined direction whose angle relative to the vertical is to be measured, with the vertical being represented by the second optical detector.

To do this, the first detector $T_F$ (which represents the determined direction whose zenithal angle is to be measured) is fixed to the sighting telescope of a theodolite for example. Further, in a theodolite, the pendulum P is free to pivot on the aiming telescope about the axis O—O and likewise, a motor M which carries and drives the disk is supported by the telescope coaxially with the pendulum.

More precisely, in the implementation shown in the figures, the first detector $T_F$ is disposed on a first side of the disk D.

In contrast, it can be seen that the receivers $T_{M\pi R}$ and $T_{MOR}$ of the second detector are disposed on the same first side of the disk D as the first detector $T_F$, while the optical transmitters $T_{M\pi E}$, $T_{MOE}$ are disposed on the other or second side of the disk.

The liquid level device L is placed above the pendulum P on the said second side of the disk and extends generally parallel to the disk D. The mirrors $M_1$ to $M_5$ and the lenses $L_1$ and $L_2$ are disposed on either side of the liquid level device, in an extension zone extending generally parallel to the disk D and situated above the pivot axis O—O of the pendulum.

The mirrors $M_1$ and $M_2$ and the lens $L_1$ are disposed between the transmitter $T_{M\pi E}$ and the liquid level divice L. The mirrors $M_3$, $M_4$ and $M_5$ and the lens $L_2$ are disposed between the liquid level device L and the receiver $T_{M\pi R}$, and more precisely between the liquid level device L and the marks 11 on the disk D.

The structure and arrangement of these optical means (mirrors $M_1$ to $M_5$, lenses $L_1$ and $L_2$, and liquid level device L) are described in greater detail below.

The principle of measurement is now briefly recalled. The description of this principle that follows may be filled-out by reading the above-mentioned published French patent application Nos. 2 270 722, 2 304 224, and 2 406 804.

The disk D is rotated at constant speed about the horizontal reference axis R—R by the motor M. To do this, the motor M having its shaft 13 connected to the disk D may be a synchronous motor powered by an alternating current at constant frequency.

As has been mentioned above, one face of the disk D carries two series of radial marks 11 and 12 which are distributed around concentric rings centered on the reference axis R—R. The disk D may be a disk of transparent glass, for example. The marks 12 of the radially inner track are formed by light reflecting material and extend radially, while the marks 11 of the radially outer track may either be formed by similar radial and light reflecting marks, or else by radial and opaque marks.

Thus, the marks 12 of the radially inner track may be detected by the first detector $T_F$ which includes a combined optical transmitter and receiver, for example a light emitting diode (LED) represented diagrammatically by a circle 14 and a juxtaposed photodiode diagrammatically represented by a circle 15.

The optical transmitter 14 is oriented generally perpendicularly to the disk D to emit at a substantially normal incidence thereto, as shown in FIG. 1. Preferably, the optical transmitter 14 and the optical receiver 15 are focused on a circular path 16 of the marks 12 by means of optical concentrator systems (not shown).

Thus, depending on whether a refelective mark 12 is present or absent from the focal point of the first detector $T_F$, the photodiode 15 either receives or does not receive light transmitted by the LED 14.

Such optical readers working by reflection are well known to the person skilled in the art and do not require further detailed description.

Similarly, the optical transmitter means $T_{M\pi E}$ and $T_{MOE}$ and the optical receiver means $T_{M\pi R}$ and $T_{MOR}$ of the second detector placed opposite the radially outer marks 11 on the disk D and on either side thereof, detect the passage of said marks.

However, unlike the first detector $T_F$ which operates by reflection, the second detector $T_{M\pi E}$, $T_{MOE}$, $T_{M\pi R}$ and $T_{MOR}$ which represents the vertical direction, operates by transmission.

As has been mentioned above, the second detector includes optical transmitter means $T_{M\pi E}$ and $T_{MOE}$ which are placed optically opposite corresponding optical receiver means $T_{M\pi R}$ and $T_{MOR}$ on either side of the disk D and level with the radially outer track of marks 11.

Under these conditions and depending on whether a mark 11 is present or absent on the optical path separating the light transmiter means from the corresponding light receiver means of the second detector equipment, the light receiver means either receive or do not receive light transmitted by the associated light transmitter means.

As above, such optical reader means are well known to the person skilled in the art and do not need further description here.

Nonetheless, it may be mentioned here that it is advantageous for the light transmitter means to be constituted by LEDs and for the light receiver means to be constituted by photodiodes.

It may further be observed, as can be seen in FIG. 1, that in the embodiment shown in the figures the second detector comprises two light transmitter and receiver pairs $T_{M\pi E}$, $T_{M\pi R}$ and $T_{MOE}$, $T_{MOR}$ each including an optical transmitter $T_{M\pi E}$ or $T_{MOE}$ and an associated optical receiver $T_{M\pi R}$ or $T_{MOR}$ disposed on opposite sides of the disk D. The respective optical receivers $T_{M\pi R}$ and $T_{MOR}$ of these pairs are diametrically disposed about the relative pivot axis O—O of the pairs, and are preferably symmetrically disposed about said axis.

Such a disposition using two sets of transmitters and receivers has already been described in the above-mentioned prior French patent applications, and to a large extent serves to eliminate errors which may result from poor coincidence between the axis of rotation R—R of the disk and the axis of rotation O—O of the detector, together with errors which result from fluctuations in the average position of the axis R—R of the disk.

Yet more precisely, the second detector comprises a main assembly including the optical transmitter referenced $T_{M\pi E}$, and the associated optical receiver $T_{M\pi R}$, with the liquid level forming device and the optical guide means comprising the mirrors $M_1$ to $M_5$ and the lenses $L_1$ and $L_2$ which are described in greater detail below interposed on the optical path thereof.

Further, the second detector also includes an auxiliary assembly which comprises the auxiliary optical transmitter device reference $T_{MOE}$ and the auxiliary optical receiver device reference $T_{MOR}$, with the auxiliary optical receiver being substantially diametrically opposed to the main optical receiver $T_{M\pi R}$ as mentioned above and is preferably symmetrically disposed relative thereto about the pivot axis O—O.

The angular shift between the first and second detectors designed in this manner about the axis O—O is determined by measuring means which receive the signals generated by the receiver means 15, $T_{M\pi R}$ and $T_{MOR}$.

These measuring means are known to the person skilled in the art and are described, for example, in the above-mentioned published French patent applications Nos. 2 270 722, 2 304 224 and 2 406 804. They are not described in further detail herein.

However, it is recalled that an approximate measurement of the angular shift between the two moving detectors is performed on the basis of signals generated by the receivers of those detectors after a unique reference mark per turn of the disk D has been detected.

This reference mark may be composed, for example, by one or more missing marks or by a mark of different width.

In addition to this approximate measurement, an accurate measurement of the angular shift in question is obtained by establishing the average of the phase shifts between the signals generated by the receiver means of the detectors over an integral number of turns of the disk D or over a number of turns which is as close as possible to being integral if the zenithal angle is variable.

There follows a description of the structure of the pendulum and of the second optical detector, and in particular of the optical guide means $M_1$ to $M_5$, $L_1$ and $L_2$ and of the liquid level device L shown in FIG. 1 and interposed between the transmitter $T_{M\pi E}$ and the receiver $T_{M\pi R}$.

However, it should first be observed as can be seen on FIGS. 1 and 3 that the radiation generated by the auxiliary optical transmitter device $T_{MOE}$ is directed directly towards the auxiliary optical receiver device $T_{MOR}$ with only the disk D interposed therebetween, and more precisely with the radially outermost track of marks 11 lying on the optical path between these devices $T_{MOE}$ and $T_{MOR}$. The optical path separating the transmitter $T_{MOE}$ from the receiver $T_{MOR}$ is preferably perpendicular to the disk and thus to the path along which the radially outermost marks 11 rotate. It may be observed as shown in FIG. 1 at 17 that it is preferable for the auxiliary receiver $T_{MOR}$ to have a diaphragm such that only radial mark 11 as illuminated by the transmitter $T_{MOE}$ can be detected at any one instant.

The mass of the pendulum P must be considered as covering all of the components which are fixed to the second detector and which are pivotly mounted about the axis O—O by means of the bearings B. However, the major part of the mass of the pendulum P is constituted by a block 100 which is suspended from the bearings B by means of rigid parallel bars referenced 111 which extend perpendicularly to the axis O—O. These bars 111 are integrated in a support frame 110 which is shown diagrammatically as being pivotly mounted on the bearings B and which supports the optical transmitters $T_{M\pi E}$, $T_{MOE}$ and the optical receivers $T_{M\pi R}$, $T_{MOR}$ together with the liquid level device L, the mirrors $M_1$ to $M_5$ and the lenses $L_1$ and $L_2$.

In order to simplify the drawings, the parts of the frame 111 which support the transmitter $T_{M\pi E}$, the mirrors $M_1$, $M_2$, $M_3$ and $M_4$ and the lenses $L_1$ and $L_2$ have not been shown.

No further detail is given on the structure of the frame 110 since numerous variations are possible and the version shown in the drawing is shown very diagrammatically.

The above-mentioned block 100 is generally delimited by two radial plane surfaces 101 which are parallel to one another and perpendicular to the pivot axis O—O of the pendulum, by a semi-cylindrical side surface 102, and by a plane upper surface 103 which is parallel to the axis O—O and lies substantially on the diameter of the semi-cylindrical side surface 102.

The mass of the block 100 and the distance thereof from the axis O—O (the length of the bars 111) are determined as a function of the available space and as a function of the mass of the various other components supported by the frame 110 in order to obtain an optimum return couple.

The bars 111 extend upwardly from the axis O—O at 112 to support a tank 30 which constitutes the liquid level L. The tank 30 is delimited by two main side plane walls 36 and 37 which are parallel to each other and perpendicular to the axis O—O, by a lower plane wall 38 which is parallel to the face 103 of the block 100 (and which would preferably be horizontal if the friction in the bearings B was negligible) and two plane sloping side walls 31 and 34 which are parallel to the axis O—O and which respectively constitute an inlet and an outlet for the radiation generated by the transmitter $T_{M\pi E}$ after reflection under the upper horizontal surface 33 of a liquid 32 contained in the tank 30.

The side walls 31 and 34 are thus provided with respective port $H_1$ and $H_2$ which are transparent to the radiation generated by the transmitter $T_{M\pi E}$.

The side walls are inclined relative to the bottom wall 38 and converge towards the axis O—O at an angle which is defined below.

It can be seen that the axes of the ports $H_1$ and $H_2$ are disposed in a common plane which is perpendicular to the axis O—O of the pendulum. This plane containing the axes of the ports $H_1$ and $H_2$ is referred to below as the tank's plane of symmetry.

Further, to facilitate the description that follows, a first pendulum reference plane is defined which will be referred to as the transverse reference plane. This plane is perpendicular to the axis O—O and is constantly vertical. A second pendulum reference plane is also defined and is referred to as the longitudinal reference plane. This longitudinal reference plane includes the axis O—O and the center of gravity of the pendulum. The longitudinal reference plane defined in this manner is theoretically vertical. However, in practice, the longitudinal reference plane is inclined to the vertical at an angle which depends on the amplitude of the friction in the bearings B.

The intersection of these two reference planes, i.e. the longitudinal and the transverse reference planes, defines a pendulum reference axis which would be exactly vertical if there were negligible friction in the bearings.

The optical path followed by the radiation generated by the transmitter $T_{M\pi E}$ before reaching the associated receiver $T_{M\pi R}$ passes through an inlet lens $L_1$, the inlet port $H_1$ of the tank 30, a reflection under the upper surface 33 of the liquid 32, the outlet port $H_2$, an outlet lens $L_2$ and the path of radial marks 11 on the disk.

The axis of the inlet lens $L_1$ is coaxial with the inlet port $H_1$ of the tank 30, i.e. it is perpendicular to the plane of the sloping inlet side wall 31.

The transmitter $T_{M\pi E}$ is disposed at the focus of the inlet lens $L_1$. Further the radiation generated by the transmitter $T_{M\pi E}$ is directed towards this inlet lens $L_1$ by being centered on the optical axis thereof, i.e. parallel to the transverse reference plane of the pendulum and perpendicularly to the sloping inlet side wall 31 of the tank.

As is shown in particular in FIG. 2, the lens $L_1$ thus transforms the divergent light beam generated by the transmitter $T_{M\pi E}$ into a beam of parallel light passing through the transparent inlet port $H_1$ which is incorporated in the sloping inlet side face 31 of the tank 30.

To do this, the transmitter $T_{M\pi E}$ may be disposed on the axis of the lens $L_1$ and at the focus thereof. The transmitter $T_{M\pi E}$ must then transmit parallel to the pendulum transverse reference plane and perpendicularly to the inlet face of the tank 30 thus preferably avoiding any refraction as it penetrates into the liquid 32.

However, in order to make a more simple and more compact disposition for the transmitter $T_{M\pi E}$ possible, the transmitter may be disposed so as to transmit towards the disk D along an optical axis 39 perpendicular to the pendulum transverse reference plane, i.e. parallel to the pivot axis O—O. Under such conditions, the optical guide means include mirrors $M_1$ and $M_2$ which are inserted between the transmitter $T_{M\pi E}$ and the inlet lens $L_1$ in order to deflect the radiation from the transmitter $T_{M\pi E}$ (optical axis 39) towards the lens $L_1$ at an incidence which is parallel to the pendulum transverse reference to the pendulum transverse reference plane and perpendicular to the inlet face 31 of the liquid level 30.

To do this, a first mirror $M_1$ is disposed in front of the transmitter $T_{M\pi E}$ having a reflective surface 40 which is looking away from the disk (as shown in FIG. 4) and which is perpendicular to the longitudinal reference plane of the pendulum and inclined at 45° downwardly relative to the pendulum transverse reference plane. Thus, the radiation generated by the transmitter $T_{M\pi E}$ centered on the optical axis 39 is reflected towards a second mirror $M_2$ which is beneath the mirror $M_1$ along an average direction 41 which is parallel to the reference axis of the pendulum (i.e. parallel to the line of intersection of the longitudinal and transverse reference planes).

Further, the mirror $M_1$ is placed at a distance from the transmitter $T_{M\pi E}$ such that the average direction 41 of the radiation reflected by the mirror $M_1$ coincides with the vertical plane of symmetry of the liquid level 30, parallel to the transverse reference plane of the pendulum and passing through the axes of the ports $H_1$ and $H_2$ and the lenses $L_1$ and $L_2$.

The second mirror $M_2$ has a reflecting surface 42 which is perpendicular to the pendulum transverse reference plane and which is inclined relative to the pendulum longitudinal reference plane to face upwardly at an angle such that it reflects the radiation received from the mirror $M_1$ along the optical axis 43 which is shared by the inlet lens $L_1$ and the inlet port $H_1$, i.e. parallel to pendulum transverse reference plane and perpendicular to the sloping inlet side wall of the liquid level 30. The normal orientation at the inlet face 31 of the parallel incident beam centered on the axis 43 thus avoids any refraction as it penetrates into the liquid 32.

More precisely, by denoting the angle of the sloping inlet side face 31 relative to the pendulum longitudinal reference plane as $\beta$, and by noting the angle of inclination of the reflecting surface 42 relative to the same longitudinal reference plane as $\gamma$, we have $\gamma = 45° + \beta/2$. For example, suitable values could be $\beta = 35°$ and $\gamma = 62.5°$.

The radiation from the inlet lens $L_1$ penetrating into the liquid 32 and centered on the optical axis 43 arrives under the top surface 33 of the liquid 32.

Under theoretical conditions of friction-free bearings B, the inclination of the optical axis 43 relative to the top surface 33 of the liquid 32 which is necessarily horizontal would be exactly equal to the above-mentioned angle $\beta$ between the sloping side inlet face 31 of the tank and the longitudinal reference plane.

After being reflected from the surface 33 of the liquid 32, the optical radiation is directed towards the second transparent port $H_2$ provided in the side face 34 of the tank 30 in the form of a beam which is still parallel and which is centered on an optical axis referenced 35 in the figures. Since the top surface 33 of the liquid 32 is always horizontal, the optical axes 35 is always symmetrical to the incident optical axis 43 relative to the vertical. This optical axis 35 is also coplanar with the plane of symmetry of the tank 30 and is thus parallel to the pendulum transverse reference plane.

On leaving the liquid 32, the light radiation may be refracted. However, the side face 34 is symmetrical to the inlet side face 31 about the longitudinal reference plane of the pendulum such that the optical axis 35 should ideally be perpendicular to the outlet side face 34 and thus coaxial with the port $H_2$. Thus, neglecting the friction in the bearing B, there would be no refraction of the radiation. In practice, however, because of the inevitable friction, the longitudinal reference plane of the pendulum is not absolutely vertical and thus there is inevitably some refraction at the outlet from the tank 30. Consequently, the parallel beam emerging from the outlet port $H_2$ is centered on an optical axis 44 which is slightly inclined to the above-mentioned optical axis 35. This parallel beam emerging from the port $H_2$ could be directly directed towards the outlet lens $L_2$.

However, as shown in FIG. 2, the parallel beam centered on the optical axis 44 is preferably deflected by mirrors $M_3$ and $M_4$ suitable for directing the beam to the lens $L_2$ at an incidence represented by the optical axis 45 which intersects the relative pivot axis O—O of the detector equipments, with the outlet lens $L_2$ being coaxial with the optical axis 45.

To do this, the mirror $M_3$ which receives the radiation emerging from the port $H_2$ has a reflecting surface 46 which is perpendicular to the transverse reference plane of the pendulum and which is downwardly inclined facing the longitudinal reference plane. The radiation reflected in this way by the mirror $M_3$ in the form of a parallel beam centered on an optical axis 47 which is parallel to the transverse reference plane and which is contained in the plane of symmetry of the tank 30 proceeds towards a fourth mirror $M_4$. This mirror has a reflecting surface 48 perpendicular to the transverse reference plane of the pendulum and upwardly inclined facing the longitudinal reference plane so as to reflect the radiation in the form of a parallel beam centered on the above-mentioned optical axis 45 which intersects the pivot axis O—O and which is coaxial with the outlet lens $L_2$. By way of example, the reflecting surface 46 may be inclined at 20° downwardly facing the longitudinal referenced plane, while the upward inclination of the reflecting surface 48 relative to the same longitudinal reference plane is 45°. In such an embodiment, the beam reflected by the reflecting surface 48 of the mirror $M_4$ reaches the outlet lens $L_2$ at an incidence illustrated by the optical axis 45 which is parallel to the transverse reference plane of the pendulum and which is inclined at 75° to the longitudinal reference plane.

The radiation focused by the outlet lens $L_2$ is then deflected towards the radially outermost marks 11 of the disk at an incidence which is normal to the disk D by a mirror $M_5$.

To do this, the mirror $M_5$ is disposed facing the outlet lens $L_2$ with a reflecting surface 49 inclined at 45° to the transverse reference plane and inclined relative to the longitudinal reference plane as well at an inclination equal to that of the optical axis 45 (i.e. 75° in this case).

The mirror $M_5$ consequently deflects radiation towards the marks 11 on the disk in the form of a converging beam centered on an optical axis referenced 50.

Here again, if the friction in the bearing B is neglected, the optical axis 50 is parallel to the pivot axis O—O of the pendulum.

Further, the mirror $M_5$ is so positioned relative to the lens $L_2$ that the lens focuses the radiation at a point 51 which coincides with that face of the disk D on which the marks 11 are formed.

It may be observed that the transmitter $T_{M\pi E}$ disposed upstream from the mirror $M_1$ has a diaphragm plate 20 with a slot-shaped aperture.

The slot in the plate 20 is oriented in such a manner that the image thereof provided by the lens $L_2$ of focal length f is radial in the plane of the marks 11 on the disk D.

In accordance with the invention, the focal length f of the outlet lens $L_2$ is determined by the equation $f=R/n$ where R represents the distance between the pivot axis O—O of the pendulum and the point of interception 51 between the optical path 50 and the track of marks 11 provided on the disk D while n represents the refractive index of the liquid 32 contained in the liquid level device L. The derivation of this equation is explained below.

Further, it may be observed in more general manner that if the mirrors $M_3$ and $M_4$ are omitted, and if the radiation centered on the optical axis 44 is consequently directly applied to the lens $L_2$, the above-mentioned equation should be replaced by the equation $f=R/(n\cdot\cos\beta)$, in which $\beta$ represents the angle formed by the beam centered on the optical axis 44 prior to being deflected by the mirror $M_5$ towards the disk relative to a plane passing through the pivot axis O—O and the point 51 where the track of marks 11 provided on the disk intersects the beam of light.

In FIG. 1, the power supply terminals to the transmitter $T_{M\pi E}$, to the transmitter $T_{MOE}$, to the receiver $T_{M\pi R}$ and to the receiver $T_{MOR}$ are referenced 60, 61, 62 and 63 respectively. These various terminals are connected via electrical conductors which are directly integrated in the frame 110 and which are mutually insulated to brushes 64 which press against slip rings E having cylindrical conductive tracks 65 about the pivot axis O—O and connected to respective electrical conductors 66 which are connected to electronic means for measuring the angle of shift or offset.

Finally, as can be seen to the left of FIG. 1, the angle encoder in accordance with the present invention includes a brake suitable for damping oscillations of the pendulum. This brake is based on the conventional eddy current principle.

In the embodiment shown, the brake is disposed below the axis O—O adjacent to the block 100 and on the other side thereof relative to the disk D.

The brake comprises a ring C of electrically conductive material such as a copper ring which is fixed to the frame and which extends perpendicularly to the pendulum pivot axis O—O. This ring C is disposed between two pairs of permanent magnets which face one another and which are diagrammatically referenced A and are supported by the pendulum support 110 in symmetrical positions about a plane perpendicular to the axis O—O. Thus, when the pendulum P oscillates about the axis O—O the copper ring C passes through the magnetic flux perpendicular to its plane due to the poles of the permanent magnets A, and thus induces oscillation damping.

In order to be integrated in a theodolite sighting telescope, the pendulum P must necessarily be of limited size and limited weight.

Thus, the return to vertical couple acting on the pendulum P is insufficient for completely overcoming the friction of the bearings B and the slip ring assembly E, even though it does tend towards the vertical.

There follows an explanation of the automatic correction process obtained using the above-described structure.

To do this, the term "theoretical optical path" is used to designate the path which would be followed by the radiation from the transmitter $T_{M\pi E}$ to the receiver $T_{M\pi R}$ if the friction due to the bearings B and to the slip rings E was, in fact, zero.

It is recalled that in the above-described structure, such a theoretical optical path is successively parallel to the axis O—O, up to the mirror $M_1$, vertical up to the mirror $M_2$, coaxial with the inlet lens $L_1$ and port $H_1$ up to top surface 33 of the liquid, coaxial with the outlet port $H_2$ up to the mirror $M_3$, and then deflected thereby and by the mirror $M_4$ to become coaxial with the outlet lens $L_2$ on a path which intersects the axis O—O until it reaches the mirror $M_5$ which finally deflects the light on a path which is perpendicular to the plane of the disk D and thus parallel to the axis O—O.

It is now supposed that the friction due to the bearings B and to the slip rings E gives rise to an angle of error α between the longitudinal reference plane of the pendulum and true vertical.

If the correction means of the present invention are omitted (i.e. the mirrors M₁ to M₅, the lenses L₁ and L₂ and the liquid level device L, this error angle causes an angular shift relative to the detector $T_F$ of the point of intersection 51 between the optical path of the radiation generated by the transmitter $T_{M\pi E}$ and the path of the radial marks 11.

This angular shift is equal to α·R where R represents the radius of the disk to the above-mentioned point 51.

The same is true for the auxiliary detector assembly $T_{MOE}$, $T_{MOR}$.

In parallel, the measuring means connected to the optical receivers determine the required zenithal angle on the basis of the general equation:

$$Z = \frac{(T_F, T_{MO}) + (T_F, T_{M\pi}) - \pi}{2} + Z_o$$

where:

$(T_F, T_{MO})$ = the angle formed by the radii of the disk D passing through the image on the disk of the diaphragm slots, or by the focus points, of the optical receivers $T_{MOR}$ and 15;

$(T_F, T_{M\pi})$ = the similar angle for the optical receivers $T_{M\pi R}$ and 15; and $Z_o$ = an arbitrary setting constant particular to each encoder.

As a result, the measurement Z is incorrect by an error equal to α (the above-mentioned angular error).

The above-mentioned correction device in accordance with the present invention eliminates this error.

To do this, and more precisely, the correction device in accordance with the invention and in the embodiment described above is so designed that the image of the slot in the diaphragm 20 placed in front of the optical transmitter $T_{M\pi E}$ is displaced tangentially to the marks on the disk to give an angular shift equal to 2·R.

The structure proposed by the invention and suffering from an angular error α causes the optical axis 35 of the radiation after reflection from the surface 33 of the liquid to be inclined at 2α relative to the theoretical optical path.

It may be observed that the angular error α has no effect on the optical path prior to reflection under the surface 33 of the liquid 32 insofar as all the optical components ($T_{M\pi E}$, M₁, M₂, L₁ and H₁) on this optical path upstream from the said surface are fixed relative to one another and relative to the pendulum.

The error 2α of the optical path 35 gives rise to an error equal to arcsine(n·sin 2α) which may be considered as being equal to n.2α between the optical axis 44 and the corresponding theoretical optical path, due to the refraction on leaving the tank 30.

This same error n·2α is retransmitted by the mirrors M₃ and M₄ to the outlet lens L₂.

Consequently, the initial angle of error induces an angular shift equal to f·tan (n·2α) which may be taken as being equal to f·n·2α of the point 51 on the disk (where f represents the focal length of the outlet lens which has previously been focused on the track of marks 11, as mentioned above).

This angular shift of f·n·2α is necessarily equal to 2αR whence the above-mentioned equation:

$$f = R/n.$$

It can readily be shown that if the mirrors M₃ and M₄ are omitted, the radiation emerging from the tank then being directly applied to the lens L₂ which is coaxial with the optical axis 44, the focal length f of the lens L₂ must be given by the equation:

$$f = R/(\cos \beta)$$

where β is the angle formed by the beam before the mirror M₅ (optical axis 44) with a plane passing through the axis R—R of the disk and the point 51. The above-mentioned equations are readily adapted to the case where the detector equipment fixed to the pendulum only includes a single assembly $T_{M\pi E}$, $T_{M\pi R}$.

The angular shift then required would be equal to R and not to 2αR thus giving $f = R/2n$.

In order to compensate with the correct sign, the number of mirrors disposed between the tank 30 and the outlet lens L₂ is even.

Naturally, the particular embodiment which has just been described should not be taken as being limiting, since it is capable of numerous variations.

For example, the rotary disk D may be replaced by a fixed disk centered on the pendulum pivot axis O—O and including similar coaxial tracks of marks to those described and shown in U.S. Pat. No. 4,108,539 for absolute angular encoding detectable by a matrix of suitable optical receivers. In such a case, the equipment $T_F$ may be omitted. The measuring means associated with the receiver means $T_{M\pi R}$ and $T_{MOR}$ of the vertical optical equipment carried by the pendulum then detect the angular shift between the vertical and a determined mark on the disk, the disk being fixed to the sighting telescope of the theodolite and coaxial with the pivot axis of the pendulum.

Further, the placing of the mirrors M₁ to M₅, of the lenses L₁ to L₂, of the tank 30 and of the transmitter $T_{M\pi E}$ may be subject to numerous variations.

In the embodiment described above, the light radiation generated by the transmitter $T_{M\pi E}$ is directed by means of the mirrors M₁ and M₂ towards the liquid level device L at an incidence which is normal to the inlet face 31. In other words, the optical axis 43 is coaxial with the lens L₁ and the inlet port H₁. This arrrangement avoids any refraction of the light radiation when it penetrates into the liquid 32.

However, since all the optical components ($T_{M\pi E}$, M₁, M₂, L₁ and H₁) inserted on the optical path upstream from the surface 33 of the liquid 32 are fixed to one another and to the reference pendulum, any such refraction of the light radiation on entering the liquid does not present a major drawback insofar as the angle of refraction is constant regardless of the angular error between the longitudinal reference plane of the pendulum and true vertical. This means that even if there is refraction on entry into the liquid, the angular shift mentioned above between the longitudinal reference plane of the pendulum and the true vertical does not modify the optical path prior to reflection under the surface 33 of the liquid 32 in any way. When the incident radiation arriving along the optical axis 43 is no longer coaxial with the port H₁, the optical axis of the radiation inside the liquid upstream from the surface 33 simply presents a constant inclination which is independent of the angular error between the longitudinal reference plane of the pendulum and true vertical, but which is related to the refractive index of the liquid and to the angle of incidence of the optical axis 43 as described above.

In a particular embodiment, tested by the applicant and giving full satisfaction, the liquid 32 is a silicone of the methylpolysiloxane type having a viscosity of 1000 centi stokes, and having an refractive index of 1.403.

We claim:

1. An angle encoder for encoding the zenithal angle between a variable determined direction and the vertical, in particular for a theodolite, the encoder being of the type comprising:
    a disk which includes at least one series of marks distributed around a circular track centered on a horizontal reference axis;
    a first optical detector suitable for pivoting about an axis which is coaxial with the reference axis of the disk and which represents the vertical relative to the pivot axis, said first optical detector including optical transmitter means comprising at least an optical transmitter associated with optical receiver means comprising at least an optical receiver placed facing the track to detect the marks thereon, and measuring means which are sensitive to the detection of the marks by the detector;
    the encoder including a pendulum rotatably mounted about a horizontal axis which is at least substantially aligned with the reference axis of the disk and which carries the first optical detector;
    optical guidance means which are fixed to the pendulum and are adapted to guiding light radiation generated by the optical transmitter of the first optical detector towards the associated receiver along a predetermined optical path intersecting the track of marks on the disk; and
    a liquid level device fixed to the pendulum and interposed on the optical path connecting the transmitter and the associated receiver of the first optical detector, the level being inserted between the transmitter and the disk, the optical guidance means and the liquid level device being adapted to ensure an angular deviation of the point of intersection of the light radiation and the track of marks on the disk relative to the pivot axis for compensating the angular error between the pendulum and the vertical.

2. An angular encoder according to claim 1, comprising a second optical detector suitable for relative pivoting with respect to the first optical detector about an axis coaxial with the reference axis of the disk, the first and second optical detectors respectively representing, relative to the relative pivot axis the vertical and the determined direction, and the measuring means being sensitive to detection of the marks by each of the detectors to determine the angular shift therebetween.

3. An angle encoder according to claim 1, wherein the disk is driven in rotation about the reference axis and wherein the marks are radial marks which are angularly spaced about said reference axis.

4. An angle encoder according to claim 1, wherein the liquid level device comprises a liquid having an upper horizontal surface and the optical guidance means introduce the radiation generated by the optical transmitter of the vertical optical equipment into the liquid of the liquid level device to ensure reflection of the radiation against the upper surface of the liquid.

5. An angle encoder according to claim 4, wherein the liquid level forming device comprises a tank containing the liquid and which includes an inlet side face and an outlet side face which are at least partially transparent to the light radiation generated by the optical transmitter to respectively enable said radiation to enter into the liquid and to enable the radiation to leave the liquid after reflection against the upper surface thereof, the optical guidance means being adapted to direct the light radiation from the optical transmitter perpendicularly to the inlet side face.

6. An angle encoder according to claim 1, wherein the optical guidance means comprise an inlet lens interposed between the liquid level forming device and the optical transmitter of the vertical optical equipment, said transmitter being placed at the focus of the inlet lens.

7. An angle encoder according to claim 1, wherein the optical guidance means include an outlet lens interposed between the liquid level forming device and the receiver of the vertical optical equipment, the track of marks on the disk being coplanar with the focal plane of the outlet lens.

8. An angular encoder according to claim 1, wherein the optical guidance means include mirrors.

9. An angular encoder according to claim 8, wherein the optical guidance means includes mirrors and the number of mirrors disposed between the liquid level forming device and the outlet lens is an even number.

10. An angle encoder according to claim 1, including a brake suitable for damping oscillations of the pendulum.

11. An angle encoder according to claim 10, wherein the brake comprises an electrically conductive component, and at least one magnetic field generator component placed adjacent thereto, one of said components being placed on the pendulum and the other on a fixed frame relative to which the pendulum swings.

12. An angle encoder according to claim 1, wherein the optical guidance means include:
    first guidance means suitable for directing the light radiation generated by the optical transmitter of the first optical detector towards the liquid level forming device at an incidence which is substantially parallel to the disk; and
    second guidance means disposed on the optical path between the liquid level forming device and the disk, suitable for receiving the light radiation leaving the liquid level forming device and for deviating said radiation towards the track of marks at an incidence normal to the disk.

13. An angle encoder according to claim 1, wherein the first optical detector includes two assemblies each comprising an optical transmitter device associated with an optical receiver device, the receiver devices being substantially diametrically opposed about the relative pivot axis of the first optical detector, thereby compensating any misalignment of the relative pivot axis and the reference axis of the disk.

14. An angle encoder according to claim 1, wherein the first optical detector carried by the pendulum comprises:
    a main assembly comprising the optical transmitter and the associated optical receiver having the liquid level forming device disposed on the optical path thereof; and an auxiliary assembly which comprises an auxiliary optical transmitter device and an auxiliary optical receiver device;

said auxiliary optical receiver device being substantially diametrically opposed to the optical receiver device of the main assembly about the relative pivot axis; and the radiation generated by the auxiliary optical transmitter being directed directly towards the auxiliary optical receiver device with only the disk being interposed on the auxiliary optical path interconnecting the auxiliary optical devices.

15. An angle encoder according to claim 13, wherein the optical receiver devices of the main and auxiliary assemblies are equidistant from the relative pivot axis.

16. An angle encoder according to claim 14, wherein the focal length f of the outlet lens is derived from the equation:

$$f = /(n \cdot c\eta s\beta),$$

in which
R represents the distance separating the relative pivot axis and the point of intersection between the optical path and the track of marks provided on the disk;
n represents the refractive index of the liquid contained in the liquid level forming device; and
β represents the angle of the beam emerging from the liquid level forming device prior to deviation by the second guidance means towards the disk and relative to a plane passing through the relative pivot axis and the point of intersection between the track of marks provided on the disk and the light radiation.

17. An angle encoder according to claim 6, wherein the optical guidance means are adapted to receive the light radiation emerging from the liquid level forming device and to direct said radiation towards the outlet lens at an incidence which intersects the relative pivot axis.

18. An angle encoder for encoding the zenithal angle between a variable determined direction and the vertical, in particular for a theodolite, of the type comprising:

a disk which includes at least one series of marks distributed on a circular track centered on a horizontal reference axis;

first and second optical detectors capable of relative pivoting about an axis coaxial with the reference axis of the disk, the first and second detectors respectively representing, relative to the relative pivot axis, the determined direction and the vertical, each of the detectors including optical transmitter means and associated optical receiver means placed facing the track of marks for detecting the presence thereof in front of each of said detectors; and means for measuring the angular shift between the detectors, which means are sensitive to the detection of the marks by each of the detectors;

the encoder including:
a pendulum mounted to rotate about a horizontal axis which is at least substantially coaxial with the reference axis of the disk and which carries the second detectors;

a liquid level forming device fixed to the pendulum;

optical guidance means fixed to the pendulum and adapted to guide light radiation generated by an optical transmitter of the second optical detector towards an associated receiver along a predetermined optical path intersecting the track of marks on the disk, and having the liquid level forming device inserted thereon, the optical guidance means comprising:

first guidance means suitable for directing the light radiation generated by the optical transmitter of the second detector at an incidence parallel to the disk towards, an inlet lens disposed upstream from the liquid level forming device on the optical path and having a focus at which the optical transmitter of the second detector is disposed such that the radiation penetrating the liquid does so in the form of a parallel beam via an inlet side face of the liquid level forming device at a normal incidence to said face to be reflected against the surface of the liquid and to leave the liquid parallel to the disk via an outlet side face of the liquid level forming device, auxiliary optical guidance means suitable for receiving the radiation from the liquid level forming device and to direct it at an incidence which intersects the relative pivot axis towards, an outlet lens, and second optical guidance means disposed between the outlet lens and the track of marks provided on the disk, suitable for deflecting the radiation towards the disk at an incidence normal thereto, with the focal plane of the outlet lens coinciding with the track of marks on the disk and on the optical path.

19. An angle encoder according to claim 18, wherein the second optical detector comprises:

a main assembly comprising the optical transmitter and the said associated optical receiver and having the optical guidance means and the liquid level forming device interposed on their optical path; and an auxiliary assembly which includes an auxiliary optical transmitter device and an auxiliary optical receiver device;

said auxiliary optical receiver device being symmetrically disposed to the optical receiver of the main assembly about the relative pivot axis, the radiation generated by the auxiliary optical transmitter device being directly directed towards the auxiliary optical receiver device with only the disk being interposed on the auxiliary optical path between said devices; and the focal length f of the outlet lens being determined by the equation:

$$f = R/n,$$

in which
R represents the distance separating the relative pivot axis and the point of interception between the optical path and the rotary path of the marks on the disk; and
n represents the refracted index of the medium contained in the liquid level forming device.

* * * * *